Feb. 4, 1958 H. R. LUBCKE 2,822,419

COLOR TELEVISION SYSTEM

Filed Dec. 26, 1951 2 Sheets-Sheet 1

INVENTOR:

Harry R. Lubcke

INVENTOR:
Harry R. Lubcke 2,822,419

COLOR TELEVISION SYSTEM

Harry R. Lubcke, Los Angeles, Calif.

Application December 26, 1951, Serial No. 263,145

8 Claims. (Cl. 178—5.2)

This invention relates in general to the art of color television and more particularly to a method for simultaneously operating receivers having plural scanning characteristics from a single transmission.

Of prime importance is the capability of operating both black and white and color television receivers from a single transmission according to the field sequential method. At the present state of the art this amounts to making the field sequential system of color television compatible with existing black and white television standards and of equivalent detail.

In accomplishing this purpose, advantage is taken of a number of new functions compatible with both the black and white and the color television processes.

Briefly, one field is scanned and transmitted according to the scanning format of black and white television. This is simultaneously the scansion of the green field for the color process, being taken through a green filter or equivalent means. Three primary colors are desirable in accomplishing color television, but the detail portrayed by the red and blue color fields need not be as great as that of the green field. Thus, in this invention, the red and blue fields are executed at double the speed of field scanning and half the number of lines as for the green field.

The video signal corresponding to the green field is transmitted at full amplitude and reproduced that way on both black and white and color receivers. The signals corresponding to red and blue are transmitted at reduced amplitude. These are largely ignored at the black and white receiver but are amplified to correspondence with the amplitude of the green field at the color receiver.

In the color receiver the persistence of the cathode ray tube phosphors for each primary color is not the same, being approximately proportional to the duration of the respective color field. Other reproducing devices, utilizing a memory delay or changing opacity in connection with auxiliary unmodulated light, may be used. With such devices a long period of persistence is obtained.

In the preferred form of this invention, this change in field scanning rate is accomplished by an "electronic alternator." This alternately switches either a fast or a slow low-frequency scanning oscillator to the scanning output circuit. The device is included at both the transmitter and the color receiver. The black and white receiver is not altered in any way in order that the requirement of compatibility be fulfilled.

The alternator includes a variable gain amplifier stage. At the transmitter this is actuated in such a manner that the video signal corresponding to the green field is amplified to full contrast, whereas both the red and blue fields are amplified to only a fraction of that amount. At a color receiver an inverse variable gain amplifier stage is a part of the alternator. The opposite phase of switching output is utilized, so that the red and blue fields are amplified more than the green field. Thus a substantial equality of contrast is obtained for all color fields. By suitable adjustment of the switching output amplitude of the receiver alternator the gain of either group of color field can also be adjusted to compensate for other factors involved in color reproduction.

It is evident that I have secured compatibility between black and white and color television without resorting to insufferably high color change frequencies, as are employed in dot-sequential color television. In that system the color rendered is changed millions of times per second and it is contaminated if inaccuracies of the order of a ten-millionth of a second occur in practical operation.

An object of this invention is to operate television receivers of plural characteristics from a single television transmission.

Another object of this invention is to simultaneously reproduce black and white and color television images from a single television transmission.

Another object of this invention is to allow black and white reception of field sequential color television images upon existing black and white television receivers without alteration thereof.

Another object of this invention is to accomplish field scansions at plural rates.

Another object of this invention is to accomplish different degrees of image signal amplification for successive scanning fields.

Another object of this invention is to increase the effective detail in the color television image over that which would be obtained by uniform field scansion, under conditions of restricted video bandwidth.

Another object of this invention is to provide a color television system compatible with black and white reception in which the change of color from one primary to another is relatively infrequent.

In the drawings:

Fig. 8 is a simplified block diagram of a black and white television receiver.

Figure 1:
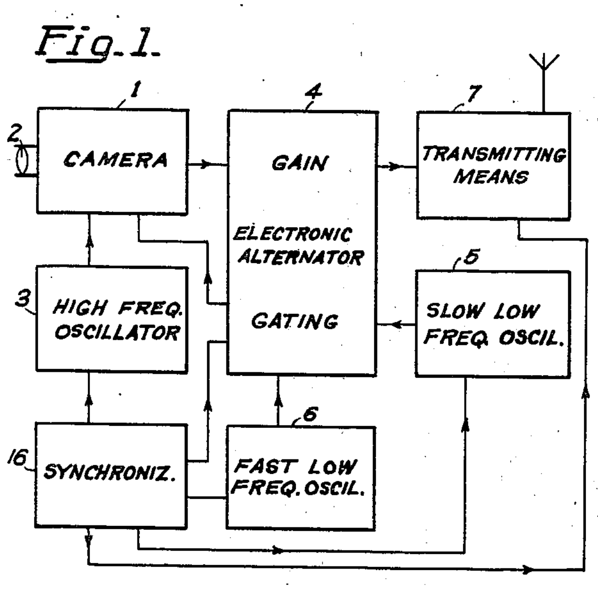
Fig. 1 is a block diagram of transmitting apparatus for accomplishing the method of this invention.

Referring to Fig. 1, numeral 1 indicates a television camera having a lens 2 and functioning to create a video signal. The rapid scanning traverses, usually horizontal, are accomplished in coaction with the high frequency oscillator 3.

The electronic alternator 4 cyclically connects either the slow low-frequency oscillator 5 or the fast low-frequency oscillator 6 to the camera 1 for accomplishing the other dimension of scanning, usually vertical. The electronic alternator also acts to vary the amplitude of the video signal from the camera to the transmitting means 7.

Figure 3:
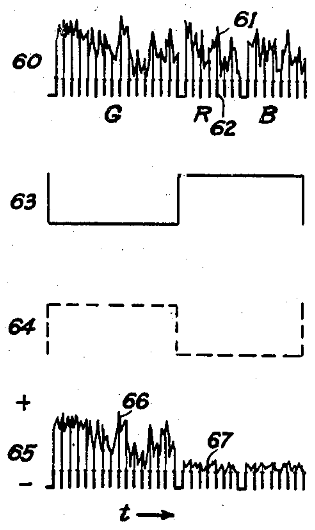
Fig. 3 shows waveforms pertinent to the variable gain operation of the alternator at the transmitter.
Figure 6:
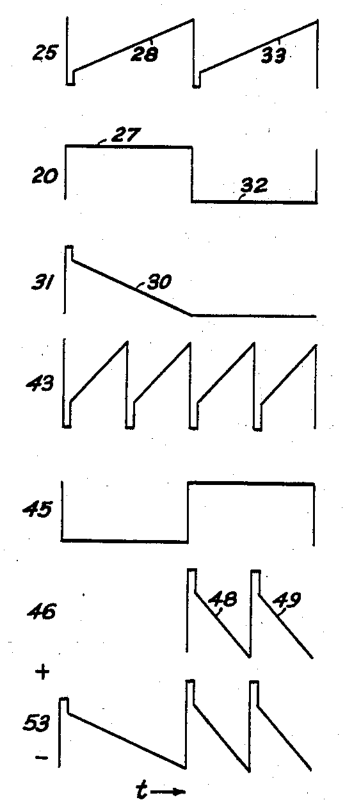
Fig. 6 shows waveforms pertinent to the switching operation of the alternator.

The alternator causes the low-frequency scanning to be executed at plural rates as shown at 53 in Fig. 6; and in time correspondence, variation of the video signal amplitude as shown at 65 in Fig. 3.

Figure 2:
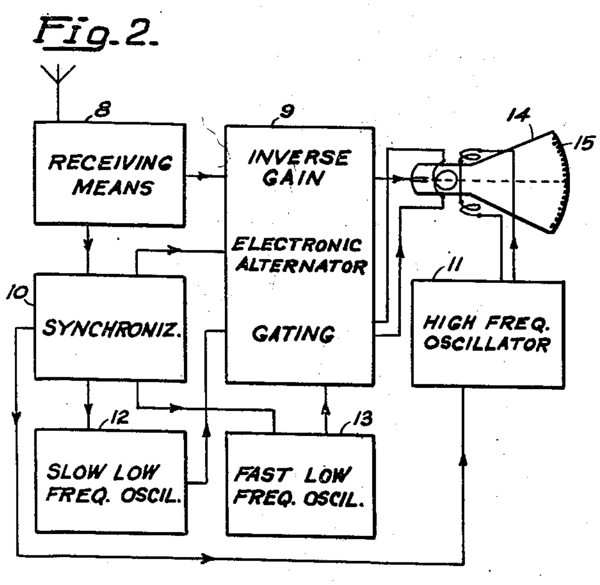
Fig. 2 is a block diagram of a color television receiver according to this invention.

In the color television receiver of Fig. 2, receiving means 8 recovers the video signal originally produced by the camera. The electronic alternator 9 performs the same function as the transmitting alternator 4 with respect to scanning but an inverse function with respect to video amplification. Synchronizing means 10 separates synchronizing information from the usual composite video signal. This is applied to the receiver high frequency oscillator 11, slow low-frequency oscillator 12, and fast low-frequency oscillator 13. The receiver alternator and two low-frequency oscillators coact to form the wave shapes shown at 53 in Fig. 6, synchronously related to those previously formed at the transmitter. The receiver alternator operates synchronously with the transmitter alternator as to scanning, but as to video amplification, it operates in opposite phase to the transmitter as shown by comparing waveform 70 of Fig. 4 with waveform 63 of Fig. 3. This causes all scanning fields to be reproduced at the color receiver at substantially equal amplitudes. In Fig. 2 the image is reproduced in color by the cathode ray tube 14, to which video and scanning energies are conveyed in the usual manner. One of the color cathode ray tubes described in my U. S. Patents No. 2,633,757, issued December 22, 1953; No. 2,699,520, issued January 11, 1955, or in my copending application Serial No. 137,635 can be used as tube 14. Plural kinds of phosphors are shown at 15.

A black and white television receiver has been illustrated, in Fig. 8 at 81, having cathode ray tube 82, brightness control 83 and contrast control 84. It is conventional in every respect. The transmitter output video waveform, 65 in Fig. 3, causes alternate 1/60 second fields to be reproduced normally (as at 66) and the intervening rapid fields to be reproduced only to the extent of raising the average brightness level slightly above black (as at 67). Random distribution of video information occurs over the receiver raster during the rapid transmitter scans because of the different field frequency at the transmitter, and an image is not formed. The residual illumination obtained by allowing a low intensity reproduction of these fields acts favorably on the flicker threshold as compared to what would obtain if this interval were completely dark. By transmitter adjustment the green (reproduced) field is modulated to black. The residual illumination supplies the increased brightness usually desired by the viewer. The 1/120 second field synchronizing pulse, being mistimed with respect to the 1/60 second period of the black and white vertical field, does not influence that circuit and the residual illumination level covers the whole raster of the black and white receiver.

Figure 5:
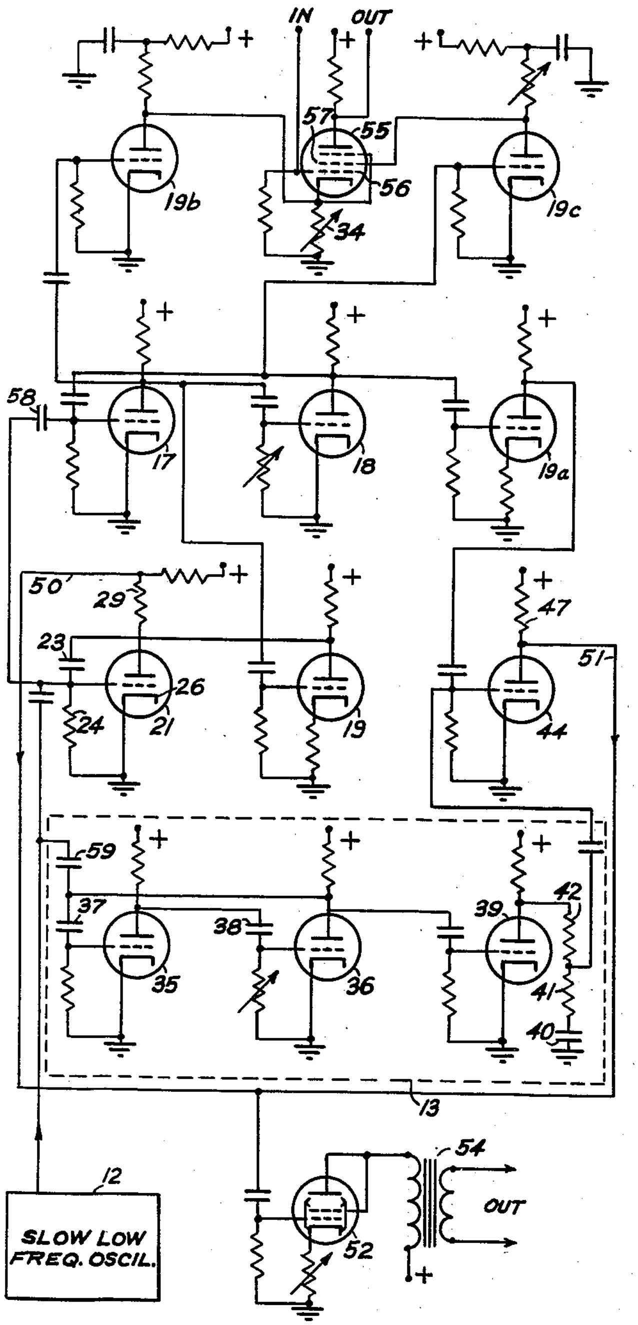
Fig. 5 is a schematic diagram of the alternator of this invention, shown in relation to coacting apparatus.

A preferred embodiment is shown in detail in Fig. 5. Vacuum tubes 17 and 18, with associated resistor-capacitor components, comprise a 60 cycle square wave oscillator. This is the keying oscillator of the receiver alternator. A multivibrator type has been shown but other types capable of giving a square wave having half cycles of equal duration may be used. Vacuum tube 19 is a clipper of the overdriven type provided to insure flat tops and bottoms of the rectangular wave, shown as waveform 20 in Fig. 6. The output of this clipper is conveyed to the grid of gate-tube 21 through capacitor 23. The connection is to the grid of tube 21 over grid resistor 24. Also impressed upon the grid of tube 21 is the output of the slow low-frequency oscillator 12. This oscillator has a sawtooth wave shape of 1/60 second duration as shown by waveform 25 of Fig. 6. This may be the conventional low-frequency oscillator used in television receivers, such as the blocking oscillator, multivibrator, or other type.

I have found it desirable to connect cathode 26 of tube 21 to ground. The positive throw of waveform 20, identified as 27, places the grid potential in the center of the class A amplifier characteristic. Cycle 28 of sawtooth waveform 25 thus appears at the output resistor 29 of the tube in reversed phase and throw 30 of waveform 31 in Fig. 6 results. During the negative throw 32 of waveform 20, the bias on the grid of tube 21 is beyond cutoff and the second portion 33 of waveform 25 is not reproduced in waveform 31. In other words, alternate waveforms are keyed out.

The fast low-frequency oscillator in Fig. 5 is represented by the apparatus within rectangle 13. Vacuum tubes 35 and 36, with associated resistor-capacitor components, comprise a multivibrator of the short pulse type. Capacitor 37 is, for example, ten times the size of capacitor 38. The frequency of operation is 120 cycles (pulses) per second. These are conveyed to integrating tube 39 in the output of which capacitor 40 and series resistors 41 and 42 forms a peaked sawtooth wave shape 43 (Fig. 6) from the pulse energy. The amplitude of the peak relative to the slope can be increased by increasing the resistance of resistor 41. The peak is, of course, included to overcome the effect of inductance in the deflection coils of cathode ray device 14 to accomplish linear deflection of the electron stream thereof.

In a manner similar to that involving vacuum tube 21, vacuum tube 44 gates out alternate pairs of cycles of waveform 43. The opposite phase of the 60 cycle multivibrator is utilized in the operation of this gate as compared to that utilized for gate 21. It is taken through clipper **19*a*. The operating to cutoff characteristic is impressed upon tube 44 according to waveform 45 of Fig. 6. The combination of waveforms 43 and 45 in vacuum tube 44 gives the waveform 46 at the output resistor 47. This is characterized particularly by the pair of sawtooth cycles 48 and 49**.

Conductors 50 and 51 lead the outputs of both gate tubes to the grid of vacuum tube 52, the low-frequency scanning output amplifier. The multi-period waveform 53 of Fig. 6 is impressed upon the grid of tube 52. Output transformer 54 is convenient in adjusting impedances to the scanning coils of image reproducer 14. The relative amplitudes of waveform throws 30, and 48—49 can be adjusted by controlling the amplitudes of waveforms 25 and 43 to compensate for the transmission characteristic of the transformer and scanning coils so that the fast and the slow low-frequency scanning amplitudes will be the same on the reproduced raster.

The two multivibrators or equivalents previously recited are to remain in synchronism with each other and with related scanning oscillators and video signal-producing devices. This is conveniently accomplished by capacitors 58 and 59 connecting the 1/60 second throw multivibrator and the fast low-frequency oscillator 13 to the slow low-frequency oscillator 12. The capacitors are of small size, a few dozen micro-microfarads, so that only a differentiated spike of the fast return of the slow waveform 25 of Fig. 6 is impressed upon the multivibrators. As an alternate, field synchronizing pulses from the synchronizing means 10 can be conveyed directly to the oscillators, as shown in Fig. 2.

Of course, electrostatic deflection may be employed in the image reproducer 14, in which case transformer 54 would not normally be utilized. Also, gating of the waveforms may be accomplished after power amplification, diodes employed to set levels and similar variations of the preferred apparatus allowed so long as the essential functions set forth are accomplished.

Figure 4:
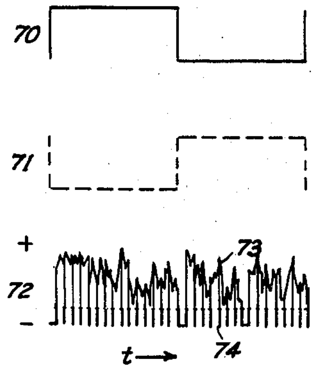
Fig. 4 show waveforms pertinent to the operation of the inverse variable gain operation of the alternator at the color receiver.

The alteration of video gain shown in Fig. 4 is accomplished by vacuum tube 55 of Fig. 5. This is preferably a multi-grid tube and both phases of the 60 cycle multivibrator are impressed upon it. One phase is impressed upon the cathode and the other upon the screen grid. The transmitted video signal, 65 of Fig. 3, is impressed upon the control grid 56.

I have found that tube 55 may be of the sharp or the remote cutoff type. One phase of the waveform 70 of Fig. 4 is impressed through clipper **19*b* upon the cathode and causes it to become less positive during the second throw shown. The amplification of tube 55 thus increases. At the same time the opposite phase of waveform 70**

(i. e., 71) is impressed through clipper 19c upon the screen grid 57. This causes the screen grid potential to become more positive, also tending to increase the amplification.

The important result is that the plural amplitude waveform 65 from the transmitter is amplified to equality of video amplitude (at 73) during the rapid fields that were scanned and transmitted at low video level as shown at 67 in waveform 65 of Fig. 3.

In this method of automatically changing amplification the alteration of the screen grid potential can be omitted. The variation in amplification from field to field is then reduced. The screen grid waveform can also be inserted in opposite polarity (i. e., waveform 70) with a further reduction in the variation of amplification. These alternates allow a desirable freedom in handling second order effects or transients, of which the prior art has spoken, but which have not been noted in this embodiment.

It was previously stated that the electronic alternators 4 and 9, at transmitter and color receiver, respectively, are identical save for an inverse gain characteristic at the receiver. This alternator has been described above. The formation of the transmitted video waveform 65 will now be described.

The video waveform originating in camera 1, Fig. 1, is shown as 60 in Fig. 3. The distinguishing characteristic of the waveform is substantially equal amplitude of video information 61 regardless of the field scanned. This amplitude is subject to some variation, of course, depending upon the proportions of the primary colors present in the scene being transmitted.

In waveform 60 the first field, of long duration, is the green primary color field identified by the letter G. Following this is the short duration red field R and following that the short duration blue field B. Color analyzing means are a part of the camera but need not be further described since such means do not form a novel part of this invention.

The red and blue fields are to be amplified considerably less than the green field in preparation for transmission so that only from the green field will an image be reproduced in the unmodified black and white television receivers.

This is accomplished by impressing the waveform 63 upon the cathode of the tube 55 and the opposite phase 64 upon the screen grid 57. The greater positive bias on the cathode and the reduced screen voltage obtaining during the red and blue fields results in the low video amplification shown at 67 in output waveform 65. It will be noted that the phase of waveforms 63 and 64 is just the reverse of the phase of waveforms 70 and 71 previously described.

The synchronizing impulses 62 shown in waveform 60 may or may not be inserted prior to the differential amplication. In any event, it is desirable to add full amplitude synchronizing impulses prior to transmission and this is indicated by the connection from the synchronizing means 16 to the transmitting means 7 of Fig. 1. At the color receiver any excess amplitude of the synchronizing component of the fast fields 74 is clipped off in video or synchronizing amplifiers.

Figure 7:
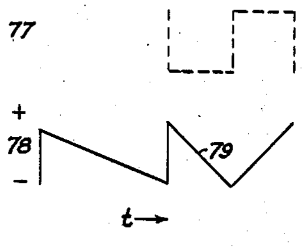
Fig. 7 shows an alternate waveform for field scanning.

Scanning schedules other than those that have been discussed can be utilized in practicing this invention. One alternate is shown in Fig. 7. Here a 1/120 second throw square wave 77 is produced by the multivibrator of the fast low-frequency oscillator 13 by the simple modification of making capacitors 37 and 38 of equal capacitance (see Fig. 5). When integrated by capacitor 40 triangular wave 79 results. Resistors 41 and 42 may be reduced in value to zero and the output taken from the ungrounded plate of capacitor 40.

The triangular wave is gated as before, in Fig. 6, and the combination of slow and fast throws shown in waveform 78 of Fig. 7 results. With this arrangement the rapid color fields are executed down and up rather than both down as before. The relation of direction of slow and fast field scans can be reversed in either embodiment by reversing the phase of one of the waveforms, such as 43 in Fig. 6.

Furthermore, the fast field periods can be altered in duration. Rather than two throws of 1/120 second duration, one throw of 1/90 second and another of 1/180 second can be accommodated in the 1/60 second interval. This is accomplished by making the capacitance ratio of capacitors 37 and 38 the average of the previously recited values; i. e., not ten to one, nor one to one, but five to one. One throw of waveform 79 then becomes 1/90 second the other 1/180 second.

Following the teaching on plurality of scanning oscillators and gates of this specification, three such devices can be caused to coact to give a sawtooth scanning waveform having the durations 1/60, 1/90, and 1/180 second. In the matter of unequal period, it is preferable to arrange the blue primary color scansion as the most rapid since the blue separation image need have the least detail for an overall satisfactory result.

Still other scanning periods can be used. Where the black and white scanning standard employed is 1/60 second per field, two 1/100 second fast fields or one 1/75 second and one 1/150 second field can be utilized. It is not necessary that the rapid fields fully occupy the same time interval as the slow field but where other requirements do not govern an obvious economy of operating time is obtained by filling this time interval with useful scanning.

Furthermore, not only two but three or more fast fields can be executed according to the teaching of this invention or only one, should two color television be desired.

More than one stage, 55, can be controlled as to gain.

In general, frequencies, intervals, color sequences, and other numerical values given in this specification are illustrative. Wide variations are possible without departing from the scope of this invention.

At the transmitter, shown in Fig. 1, a special capability of the synchronizing means 16 is desirable. At the end of each blue field, B in Fig. 3, an additional half line of scanning is inserted.

In the usual black and white transmitter and black and white receiver arrangement, successive fields are interlaced. In the present instance, where rapid red and blue fields are interposed, it is still obviously desirable to interlace the green fields for both black and white and for color reproduction. The red and blue fields interlace as a separate matter according to an inherent timing regimen.

Each one-thirtieth second, therefore, in the case of the scanning standard first described in this specification, the synchronizing pulse for the slow low frequency oscillator, 5, occurs a half line late at the end of the blue field. This is 1/31500 second for the standard 525 line black and white (and green) format; only one tenth percent departure from the norm.

The desired effect can also be obtained by causing the synchronizing pulse to occur a half line early, and earliness and lateness can be alternated to cause the norm to be retained.

Turning to the matter of video amplitudes, it is not necessary to fix a limit upon the amplitude of the red and blue video information, shown at 67 in waveform 65 of Fig. 3, but for guidance it can be stated that this need not be less than 10% of the green amplitude, 66. Depending upon the whiteness of the image desired by the viewer and the viewing distance, the limit can be greater.

Field synchronizing pulses are invariably serrated in practice. The pulse that occurs between the red and blue fields can be composed of wide serrations and can be of reduced amplitude so as to be indistinguishable upon black and white receivers.

As an alternate, the know high frequency vertical burst type field synchronizing pulse as proposed in 1940 as a national standard for field synchronization can be employed between these fields, in which case the non-synchronous reproduction thereof is a fine "salt and pepper" of several dozen cycles of the 500,000 cycle high frequency used to effect field synchronization. This matter is detailed in the book, "Television Standards and Practice," D. Fink, McGraw-Hill, 1943; pp. 280–299, etc.

The adjustment of amplification of alternate fields in tube 55 is controlled by the variable cathode resistor 34. In practice, this adjustment gives smooth control over a wide range of signal input level and degree of amplification desired. The variable plate resistor of clipper 19c also controls; altering the amplitude of the keying wave applied to the screen grid. These and other variable controls shown are not normally adjusted during operation, being of the nature of service controls that are seldom readjusted.

In the color receiver according to this invention advantage can be taken of the unequal field periods in selecting the decay characteristics of the phosphors 15 on the screen of the cathode ray tube 14. With a rotating color filter (not shown) for reproducing the color image the intensity of residual white light should not be in excess of 10% of the maximum value by the time the next color field is started. Consider the color sequence of waveform 60, Fig. 3; the green primary is exhibited for 1/60 second, the red for 1/120 second and the blue for 1/120 second. I select phosphors as nearly matching the transmission band of the respective color filters as possible and having durations of afterglow to 10% light of 1/60 second for green and 1/120 second for red and blue. Both filters and phosphors have minimum spectral overlap. Consequently, although the persistence of the green phosphor component is too long for the red and blue fields it is not seen because the red and blue filters will not pass green light.

All electronic image reproducers are well suited for element 14 in Fig. 2. In my copending applications referred to above the phosphors need not be selected with care as to a limit on persistence, only that the green phosphor have a persistence approximately twice as long as the other two and that it preferably persist for something in excess of 1/60 second. Numerous suitable phosphors are now available as articles of trade.

Storage type image reproducers are also well suited for element 14 in Fig. 2. In such devices, means are provided for establishing a charge image and either utilizing leakage or providing a discharging ray to remove the charge after an interval. If used in conjunction with mechanically moved color filter due attention to the persistence and spectral response of the phosphors must be given. If used directly with a multiphosphor screen only the broad limit on the geometric expansion of size of a rapidly moving object in the field of view need be met.

In the practice of this invention the transmitting and receiving means shown at 7 and 8 in Figs. 1 and 2 can be dispensed with and a conductive connection substituted. The latter arrangement would apply for camera-color monitor and wire line installations whereas the transmitter-receiver means are characteristic of broadcasting, there usually being a multiplicity of receivers operating.

As used in this specification and claims the terms "black and white" and "monochrome" are to be considered synonomous as against "color" as defining an image in natural colors.

Having thus fully described my invention and the ways in which it can be practiced, I claim:

1. A television system of plural image-forming characteristics comprising, color image-signal producing means, electronic scanning means actuating said means, an electronic circuit connected to both said means to cyclically alter the rate of operation of said scanning means and concurrently the amplitude of the output of said signal producing means to form a signal of large amplitude at one said rate and a signal of small amplitude at other said rates, image reproducing means coactively connected thereto and scanning at a fixed rate to reproduce an image of said signal of large amplitude at said one rate, further image reproducing means similarly and simultaneously connected, electronic scanning means and signal output means connected thereto, an electronic circuit coacting therewith to control said scanning means at said actuating and said altered rate, means to synchronize said first and said last electronic circuits, said last electronic circuit coactively connected to said signal output means to alter amplitude of the output thereof in an inverse manner to the alteration of said first electronic circuit prior to image reproduction by said further image reproducing means, said further image reproducing means constituted to reproduce superimposed transient light images at each of said rates, each reproduced image being of a different color than that of the previous one.

2. A television system for successively televising and reproducing images of plural characteristics at different rates within the interval of persistence of human vision, comprising; means for producing image signals at one of two different amplitudes for each said characteristic and at corresponding different rates, means actuated by said first means for reproducing color television images, electronic circuit means connected to and coacting therewith synchronized with said signal producing means for altering said signal amplitudes to approximate equality, electronic scanning means connected to and coacting with said image reproducing means, electronic synchronizing means connected to and coacting with said scanning means for controlling said scanning means at said corresponding different rates, radiant energy emissive elements in said reproducing means, one for each said plural characteristic and excited by the corresponding said image signal, the rapidity of decay of emission of said elements corresponding with the rate of reproduction of said characteristic.

3. In a color television system for presenting successive images within the period of persistence of vision a color transmitter comprising, polychromatic image-signal-forming means, an amplifier connected thereto, scanning means adapted to scan at two rates connected to said forming means, an electronic switching circuit coactively connected to said scanning means to automatically alter the rate of successive whole scansions of the image area in the sequence of one slowly and two rapidly, said circuit coactively connected to said amplifier to alter the amplification thereof corresponding to the alteration of the scanning rate, said amplification being greatest for the slow scansion.

4. In a color television system for presenting successive images within the period of persistence of vision in which different color fields are scanned at different rates and with a video signal amplitude inversely corresponding to the maximum and the minimum values of said rates, color television transmitting apparatus, comprising; optical-electronic-video-signal-producing means, plural electronic scanning means of different periods connected thereto, color analyzing means of plural hue coactively connected to said producing means, automatic electronic circuit means for causing one scanning means to operate said signal producing means during the operation of said means with the analyzing means of one hue and for another scanning means with another hue, an amplifier connected to said producing means, control means connected to said amplifier operative synchronously with said automatic electronic circuit means for causing change of scanning means and capable of altering the average signal amplitude out of said amplifier inversely according to only the maximum and the minimum values of said different rates.

5. In a color television receiver having plural field scanning means, a color image reproducer and image-signal amplifying means, an electronic circuit comprising;

gating means connected to and coactive with said scanning means to alternately block and pass energy from each of said plural scanning means to said image reproducer, and gain-affecting means coactively connected to said amplifying means to automatically alter the amplification thereof between two values in synchronism with the alternate coaction of said gating means with said scanning means, said thus altered image-signal applied to and controlling the light intensity of said color image reproducer.

6. In a color television transmitting channel having two image-scanning-energizing means of different field frequency and having image-signal amplifying means, an electronic circuit for switching comprising; an oscillator, a vacuum tube connected to said oscillator and to one scanning means of said channel, a second vacuum tube connected to said oscillator in opposite phase to said first connection and also to the other scanning means of said channel, a third vacuum tube connected to said oscillator and to amplifying means of said channel, said latter connection effecting automatic control of the amplification of said amplifying means between two values by said oscillator and the recited connections to said scanning-energizing means effecting alternate equivalent activation thereof in the image-scanning process, whereby two image-scansions at the more rapid field frequency are executed at a low value of amplification between each image-scansion of the less rapid field frequency which is executed at a high value of amplification.

7. In a color television receiver having an image reproducer, plural field scanning energizing means grouped as to proximity of operating frequency and a variable gain video amplifier having input and output electrodes, an electronic circuit comprising; an oscillator operative at the repetition frequency of the slowest of the plural field scanning energizing means, electronic gating tubes connected to said oscillator and to each of said plural field scanning energizing means for the alternate connection thereof to said reproducer, said oscillator also connected to a plurality of input electrodes of said amplifier and means to adjust the coaction between said oscillator and said amplifier to alter from one value to one other the amplitude of the signal at the output electrode thereof in correspondence with and for the duration of the connection of each of said group of plural field scanning energizing means to said reproducer.

8. In a color television system in which different color fields are scanned at different rates within the period of persistence of human vision and with a corresponding difference of video signal amplitude, a color television receiver, comprising; a color television image reproducer, plural electronic scanning means having different rates, one for each of the previously mentioned different rates of scanning, an oscillator producing alternating electrical energy at a rate related to at least one of said different rates, a multiple electrical gating means, said oscillator connected to said gating means, said gating means connected to each of said plural scanning means and to said reproducer for the successive actuation of said reproducer by said plural scanning means, an amplifier tube for amplifying said video signal having plural control electrodes and an output electrode, said output electrode connected to said reproducer, said plural control electrodes connected to said multiple gating means to control the amount of amplification of said video signal in accordance with the alternating electrical energy of said oscillator to bring the amplitude of said video signal to substantial equality for all of the different rates of scanning.

References Cited in the file of this patent

UNITED STATES PATENTS

| | | |
|---|---|---|
| 2,187,374 | Finch | Jan. 16, 1940 |
| 2,333,969 | Alexanderson | Nov. 9, 1943 |
| 2,381,902 | Goldsmith | Aug. 14, 1945 |
| 2,406,266 | Sziklai | Aug. 20, 1946 |
| 2,406,760 | Goldmark | Sept. 3, 1946 |
| 2,429,849 | Somers | Oct. 28, 1947 |
| 2,438,269 | Buckbee | Mar. 23, 1948 |
| 2,580,685 | Mathes | Jan. 1, 1952 |
| 2,635,140 | Dome | Apr. 14, 1953 |
| 2,703,339 | Goldsmith | Mar. 1, 1955 |

FOREIGN PATENTS

| | | |
|---|---|---|
| 709,245 | Great Britain | May 19, 1954 |
| 709,496 | Great Britain | May 26, 1954 |

OTHER REFERENCES

"Principles of NTSC Compatible Color Television," Electronic, February 1952, (first presented October 1951), pages 88–97. (Copy in 178–5.2 Pub.)